(Model.)

J. E. LITTLE.
GATE.

No. 264,718. Patented Sept. 19, 1882.

Witnesses,
Edwin L. Yerrell.
J. J. McCarthy.

Inventor.
John E. Little
By C. M. Alexander.
Attorney.

UNITED STATES PATENT OFFICE.

JOHN E. LITTLE, OF PRINCETON, INDIANA.

GATE.

SPECIFICATION forming part of Letters Patent No. 264,718, dated September 19, 1882.

Application filed May 4, 1882. (Model.)

*To all whom it may concern:*

Be it known that I, JOHN E. LITTLE, of Princeton, in the county of Gibson, and in the State of Indiana, have invented certain new and useful Improvements in Gates; and I do hereby declare that the following is a full, clear, and exact description thereof, reference being had to the accompanying drawings, and to the letters of reference marked thereon, making a part of this specification.

This invention relates to certain improvements in farm-gates; and it has for its objects to provide a gate that can be moved back longitudinally a short distance to permit the passage of small stock and prevent the passage of large stock, and which can be swung entirely open to permit the passage of such large stock, as more fully hereinafter specified. These objects I attain by the means illustrated in the accompanying drawings, in which—

Figure 1:
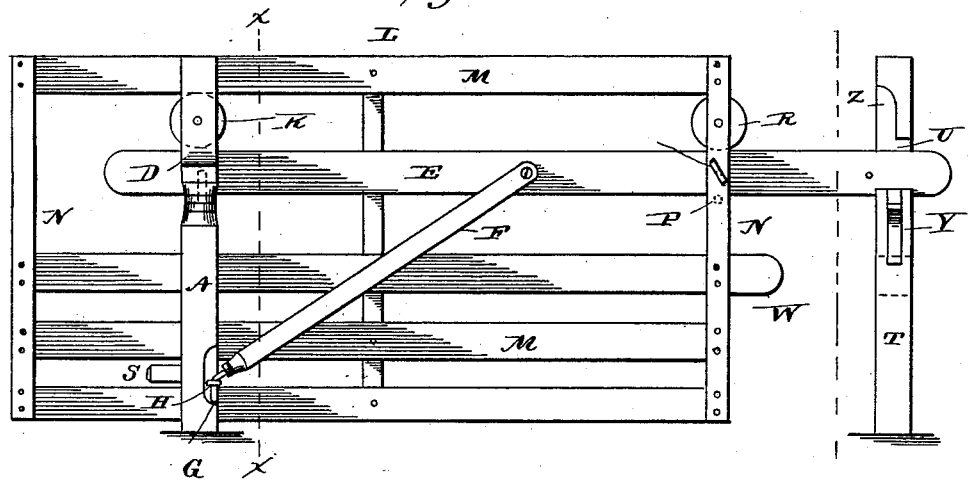
Figures 2, 3:
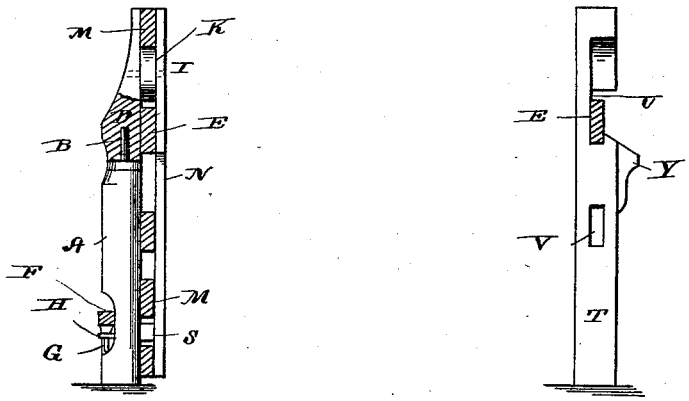

Figure 1 represents a side view of the gate, showing the same partly open for the passage of small stock. Fig. 2 represents a vertical section on the line $x\,x$ of Fig. 1. Fig. 3 represents an elevation of the post against which the gate abuts when closed.

The letter A indicates the post which supports the gate. The said post is provided with an upright pin, B, upon which is pivoted an upright, D, to which is secured a horizontal bar, E, from which extends obliquely downward a bar, F, which is provided with a pintle, G, which is pivoted in an eye, H, secured to the lower part of the post A in such manner as to permit the bar to swing freely in the arc of a circle around the post. To the bar E, opposite the upright D, is secured an upright, I, a wheel, K, being journaled between the two standards, upon which the top rail of the gate may travel.

The letter L indicates the gate, which consists of a series of parallel rails, M, secured at the ends between upright rails N. The horizontal bar extends between the forward uprights, and between a pin, P, and a friction-roller, R, journaled between the uprights M. The said friction-roller travels upon the bar E when the gate is forced back longitudinally.

The letter S indicates a stud secured to the post A, and setting between the lower rails of the gate to guide the gate and hold it to the post.

The letter T indicates the post against which the gate abuts when closed. The said post at one side is provided with a recess, U, the lower edge of which is undercut and forms a catch to secure the end of the bar E when the gate is closed or partially closed, as indicated in Fig. 1 of the drawings. The post T is provided with a slot, V, for the reception of the end W of one of the rails when the gate is closed.

The letter Y indicates a guide for guiding the end of the bar E to the recess in post T when the gate closes on its hinges.

The letter Z indicates a recess in which the roller R sets when the gate is closed upon the horizontal bar.

It will be seen that as thus constructed the gate may be moved longitudinally upon the rail to make a passage for small stock, or swung upon its pivots to form a passage for large stock, and that when closed it possesses great strength.

Having thus described my invention, what I claim, and desire to secure by Letters Patent, is—

1. In a gate, the combination, with the supporting-post and upright pivoted thereon, provided with an anti-friction roller, of the horizontal bar or rail, its oblique pivoted brace, and the gate provided with a traveling roller and adapted to slide on said rail, substantially as shown and set forth.

2. In combination with the supporting-post having thereon the pivoted upright, the transverse bar fastened to said upright, and the oblique bar connected thereto and pivoted to the supporting-post, the latch-post and the gate adapted to slide back and forth, as described, and for the purposes specified.

In testimony whereof I affix my signature, in presence of two witnesses, this 10th day of April, 1882.

JOHN E. LITTLE.

Witnesses:
E. E. WILKINSON,
GEO. F. EATON.